Jan. 29, 1963    A. FIOR ET AL    3,075,857
PACKAGING PRODUCTS COMPRISING COATED POLYPROPYLENE FILM
Filed April 28, 1959
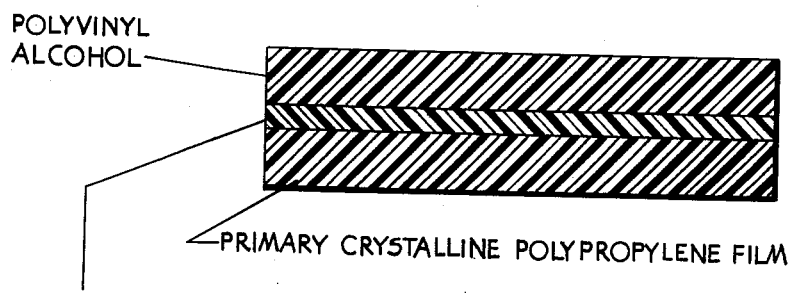
POLYVINYL ALCOHOL
PRIMARY CRYSTALLINE POLYPROPYLENE FILM
INTERMEDIATE FILM MADE OF EITHER GRAFT COPOLYMER OF ACRYLONITRILE AND POLYPROPYLENE OR MIXTURE OF AMORPHOUS POLYPROPYLENE AND POLYAMIDE
INVENTORS
ALDO FIOR
LUCIANO LUCCHETTI
BY *Toulmin & Toulmin*
ATTORNEYS United States Patent Office 3,075,857
Patented Jan. 29, 1963

3,075,857
PACKAGING PRODUCTS COMPRISING COATED POLYPROPYLENE FILM
Aldo Fior and Luciano Lucchetti, Terni, Italy, assignors to Montecatini Società Generale per l'Industria Mineraria e Chimica, a corporation of Italy
Filed Apr. 28, 1959, Ser. No. 809,513
Claims priority, application Italy May 2, 1958
3 Claims. (Cl. 117—76)

The present invention relates to the production of improved packaging films which have, as a base material, an alpha olefin polymer, showing at least 60% crystallinity at the X rays at room temperature. These films are highly impermeable to gases, vapors and oils and therefore are suitable for the production of bags, cartons, bottles and the like.

It has been previously disclosed that films produced from crystalline alpha olefin polymers not only have extraordinary thermal and mechanical qualities but also are produced very economically. These films have a low permeability to water vapor, but on the other hand exhibit relatively high permeabilities to such gases as oxygen, nitrogen, carbon dioxide, and also to organic vapors, and additionally to animal and vegetable oils. For certain uses, films having these precise properties are very desirable, e.g. the packaging of vegetables, where permeability is desired.

In many other instances, however, these films are inadequate due solely to their high permeability to gases and the like. For example, it is well known that certain contaminating gases spoil cooked meat and cheese and that the presence of oxygen accelerates the rate of rancidity of fats, oils, powdered milk, and the like. Also because of high permeabilities to animal and vegetable oils, these alpha olefin films could not be used for packaging such oily materials as lard, butter, fish, meat, etc. Moreover, films which are highly permeable to organic vapors would be of comparatively little utility in the manufacture of containers for perfumes and other odoriferous compositions.

It is an object of the present invention to provide films, based on alpha olefin polymers, which can be efficiently used in packaging materials such as those described in the preceding paragraph.

Another object is to provide a process for the production of said alpha olefin base films.

Upon further study of the description and the appended claims, other objects will become apparent.

According to this invention, it is necessary to use a film made from a polymeric alpha olefin showing at least 60% crystallinity at the X rays at room temperature. The alpha olefin monomer from which the polymer is obtained has the general formula $CH_2=CH-R$ where R contains from 1 to 16 carbon atoms e.g. propylene, butene, pentene, styrene, etc. These crystalline alpha olefin polymers can be obtained by stereospecific catalysis, for example.

Natta et al. have disclosed, in their pending application Serial No. 550,164, a process for the stereospecific polymerization of propylene. Such a process consists in polymerizing propylene in contact with a catalyst prepared by (a) starting with a highly crystalline halide of a transition metal in which the metal has a valency not higher than 3, e.g. $TiCl_3$, and (b) mixing said halide with an alkyl compound of a metal of Group 2 or 3 of the Mendeleeff Periodic Table, e.g. triethyl aluminum, to obtain a polymerizate consisting prevailingly (over 60%) of isotactic macromolecules as defined by Natta et al., and which polymerizate usually also contains some amorphous non-crystallizable, linear, regular head-to-tail macromolecules and some stereoblock macromolecules which comprise isotactic portions and exhibit relatively low crystallinity.

The essence of this invention lies in the provision of a secondary layer or film of a polymeric material onto the primary film (preferably polypropylene) of an alpha olefin polymer. This secondary layer provides the alpha olefin polymer with markedly improved resistance to gases, vapors, fatty oils, and the like. A preferred embodiment of the secondary film is a coating of polyvinyl alcohol preferably having at least 80% of the OH groups uncombined, and another embodiment is a vinylidene chloride copolymer preferably containing at least 80% vinylidene chloride by weight copolymerized with either acrylonitrile or vinyl chloride.

In those films wherein the secondary layer is so highly hydrophilic that liquid water would damage it, it is preferable to attach a protective film onto the secondary film. This protective film can be comprised of a very thin layer of a water-resistant resin such as phenol-formaldehyde polymers, vinylidene polymers and copolymers, and vinyl polymers and copolymers, such as polyvinyl acetate, and polyvinyl butyral.

In some cases, the adhesion of the secondary film to the primary film is unsatisfactory, and in order to obtain better adhesion, it is preferred to modify the primary film to provide a more adhesive surface. One method of increasing the adhesiveness is to coat the primary film with a solution containing modified amorphous polypropylene. Still another method of increasing the adhesiveness of the primary film is to utilize the technique of graft polymerization by actually graft-polymerizing acrylonitrile onto the surface of the primary film whereby a graft copolymer of acrylonitrile and the polymeric alpha-olefin is formed at said surface, according to the process described in pending application to Bonvicini et al., Serial No. 698,334, filed November 25, 1957, and assigned to the same assignee as the present application.

As disclosed in said pending application, a primary film of the polypropylene is first peroxidized at the surface thereof in any suitable way, as by treating the film with an oxygen-containing gaseous mixture, for example air, at a temperature between 50° C. and 120° C., preferably between 60° C. and 90° C., and under atmospheric pressure or a pressure of 3 to 4 atmospheres, until the amount of oxygen taken up in the form of peroxide (—O—O—) groups is such that its weight is increased by a few hundredths of a gram for each 100 grams of the film weight.

Instead of air, mixtures of nitrogen in air, or air enriched in oxygen can be used.

By contacting the peroxidized film with acrylonitrile, under heating, the active oxygen released by decomposition of the hydroperoxide groups introduced into the polypropylene by the peroxidation treatment serves to initiate polymerization of the acrylonitrile and the polymeric chains thus formed are, for the most part, grafted onto (chemically bound to) the polypropylene at the surface of the film.

The resulting film having a surface comprising a graft copolymer of acrylonitrile and the polypropylene is then washed with solvents which remove any residual unpolymerized acrylonitrile, and any non-grafted polyacrylonitrile formed, and is finally dried.

A self-explanatory drawing of a preferred embodiment is attached.

Various secondary, intermediate and protective layers can be obtained by coating the primary film with aqueous or organic dispersions or solutions. Conventional methods of application such as continuous or batch immersion and spreading techniques can be used.

The thickness of the various coatings can vary considerably, generally from 2 microns to 20 microns depending on the thickness of the primary film.

The following examples serve as specific embodiments and are not intended to be limitative.

The adhesive bond between the primary and secondary layers is measured by the simple expedient of pressing a piece of adhesive cellulose tape onto the secondary layer, then quickly stripping the cellulose tape from the layer. If the cellulose tape retains no secondary layers, the bond is satisfactory.

Gas permeability is determined by introducing a gas stream into one part of a cell separated from the other part by the film under examination. The pressure developed on the opposite side of the film is a measure of the permeability of the gas through the film.

EXAMPLE I

A polypropylene film, showing 95% crystallinity at the X rays at room temperature and having a thickness of 50 microns, and having a surface comprising a graft copolymer of acrylonitrile and the polypropylene, and obtained by treating the film according to one of the methods described in the pending U.S. application to Bonvicini et al., Serial No. 698,334, filed November 25, 1957, is coated by immersion into a bath consisting of the following solution: 15 parts of a copolymer obtained from 90 parts vinylidene chloride and 10 parts acrylonitrile, 20 parts tolene and 65 parts methylethylketone. This solution has previously been kept at 80° C. in order to dissolve the polymer; but during the coating operation the solution is kept at a temperature between 50° and 60° C. After withdrawal from the bath, the film is dried at 50–60° C. for 5 minutes.

The coated film maintains its brilliancy and transparency. The adhesion of the coating, determined by means of the adhesive tape under pressure, appears satisfactory. Gas permeabilities of the film thus coated, compared with those of an uncoated control film, are reported in the following table.

Table 1

| Film | Q.10⁹ | | |
|---|---|---|---|
| | $CO_2$ | $O_2$ | $N_2$ |
| not coated | 0.510 | 0.200 | 0.058 |
| coated | 0.00195 | 0.00120 | 0.048 |

EXAMPLE II

The data relative to the other examples of this process are reported in the following table. The films are prepared substantially as described in Example I, but an interlayer is interposed between the base film and the coating in order to favor a tight adhesion of the coating to the support. The interlayer is obtained by immersion of the crystalline polypropylene film into a bath consisting of a solution (in 95 parts chloroform) of 2.5 parts amorphous polyproylene and 2.5 parts low molecular weight polyamide. The film thus treated is subjected to drying at 50–60° C. for 2 minutes.

In all the aforementioned cases, the film provided with an interlayer and a coating maintains its characteristics of brilliancy and transparency, and the adhesion of the coating, determined by means of the adhesive tape under pressure, appears excellent.

Table 2

| Film | Q.10⁹ | | |
|---|---|---|---|
| | $CO_2$ | $O_2$ | $N_2$ |
| not coated | 0.510 | 0.200 | 0.058 |
| coated and provided with an interlayer of: | | | |
| amorphous polypropylene | 0.0015 | 0.00096 | 0.048 |
| amorphous polypropylene and polyamide | 0.0018 | 0.00096 | 0.051 |

EXAMPLE III

A container made from polypropylene, showing 86% crystallinity at the X rays at room temperature, is coated with a thin film of a copolymer obtained from 80 parts vinylidene chloride and 20 parts acrylonitrile by immersion in a solution of 15 parts of said copolymer in 85 parts methylethylketone; the polypropylene container has previously been subjected to a treatment for the formation of an interlayer, as described in the preceding example. The permeability to organic vapors of the container thus treated is determined by filling it with a known weight of organic liquid and determining the variation of weight undergone after keeping it at 25° C. for 30 days. The results obtained from these tests are enumerated in the following table:

Table 3
WEIGHT VARIATIONS

| liquid | uncoated container | coated container |
|---|---|---|
| ethyl alcohol | 0.12 | 0.01 |
| lemon essence (20% alcohol) | 7.01 | 0.15 |
| p-cimene (20% alcohol) | 2.96 | 0.32 |
| chloroform (20% alcohol) | 1.81 | 0.09 |
| cologne water | 0.21 | 0.02 |

In addition to polypropylene, other polymeric films made from alpha olefin monomers, $CH_2=CH-R$ where R contains from 1 to 16 carbon atoms e.g. butene-1, pentene-1, styrene, etc. can be treated in substantially the same way as described in the preceding examples to yield comparable films that are highly impermeable to gases, organic vapors, fats and oils.

It is understood that the inventors intend to claim, as a part of their invention, any variation, substitution and changes that lie within the scope of the invention and the hereinafter appended claims and intend to include within the scope of said claims such changes as may be apparent to those skilled in the art in the practice of the principles of this invention and within the scope as set forth in the hereinabove-stated specification.

What we claim is:

1. A method of producing an impermeable, multilayer film comprising graft polymerizing acrylonitrile onto a surface of a primary layer of polypropylene consisting prevailingly of isotactic macromolecules and which exhibits a crystallinity at room temperature of at least 60% as determined by X-ray analysis, to thereby form a graft copolymer of acrylonitrile and polypropylene at the surface of the primary layer, and adhering to said graft copolymer an impermeable layer being selected from the group consisting of polyvinyl alcohol, polyvinyl chloride, polyvinyl acetate, polyvinyl butyral, copolymer of vinyl chloride and vinyl acetate, copolymer of vinylidene and vinyl chloride, and copolymer of vinylidene chloride and acrylonitrile.

2. An impermeable, multi-layer film comprising a primary layer of polypropylene, said polypropylene having a crystallinity at room temperature of at least 60% as determined by X-ray analysis, at least one intermediate layer on the surface of said primary layer, said intermediate layer consisting of a graft copolymer of acrylonitrile and polypropylene, and at least one secondary layer on the surface of said intermediate layer, said secondary layer being selected from the group consisting of polyvinyl alcohol, polyvinyl chloride, polyvinyl acetate, polyvinyl butyral, copolymer of vinyl chloride and vinyl acetate, copolymer of vinylidene and vinyl chloride, and copolymer of vinylidene chloride and acrylonitrile.

3. An impermeable, multi-layer film comprising a primary layer of polypropylene, said polypropylene having a crystallinity at room temperature of at least 60% as determined by X-ray analysis, at least one intermediate layer on the surface of said primary layer, said intermediate layer consisting of a mixture of amorphous polypropylene and a polyamide and at least one secondary layer on the surface of said intermediate layer, said secondary layer being selected from the group consisting of polyvinyl alcohol, polyvinyl chloride, polyvinyl acetate, polyvinyl butyral, copolymer of vinyl chloride and vinyl acetate, copolymer of vinylidene and vinyl chloride, and copolymer of vinylidene chloride and acrylonitrile.

References Cited in the file of this patent

UNITED STATES PATENTS

| | | |
|---|---|---|
| 2,668,134 | Horton | Feb. 2, 1954 |
| 2,672,427 | Bauling et al. | Mar. 16, 1954 |
| 2,837,496 | Vandenberg | June 3, 1958 |
| 2,876,358 | Root | Mar. 3, 1959 |
| 2,879,177 | Nelson et al. | Mar. 24, 1959 |
| 2,888,367 | Greyson | May 26, 1959 |
| 2,897,092 | Miller | July 28, 1959 |
| 2,927,047 | Schulde | Mar. 1, 1960 |
| 2,973,241 | Scott et al. | Feb. 28, 1961 |